United States Patent
Xu et al.

(10) Patent No.: US 8,666,421 B2
(45) Date of Patent: Mar. 4, 2014

(54) METHOD FOR SPECTRUM SENSING IN COGNITIVE RADIO NETWORKS WITH OPEN WIRELESS ARCHITECTURE

(76) Inventors: Limei Xu, Mountain View, CA (US); Jenny Hu, Cupertino, CA (US)

( * ) Notice: Subject to any disclaimer, the term of this patent is extended or adjusted under 35 U.S.C. 154(b) by 247 days.

(21) Appl. No.: 13/217,743

(22) Filed: Aug. 25, 2011

(65) Prior Publication Data

US 2012/0289236 A1   Nov. 15, 2012

Related U.S. Application Data

(60) Provisional application No. 61/485,632, filed on May 13, 2011.

(51) Int. Cl.
  *H04W 16/14*   (2009.01)
(52) U.S. Cl.
  USPC ........... 455/446; 455/574; 455/450; 370/338; 370/278

(58) Field of Classification Search
  USPC ............... 455/450–454, 574, 343.2; 370/338, 370/278, 319, 280, 281
  See application file for complete search history.

(56) References Cited

U.S. PATENT DOCUMENTS

| | | | |
|---|---|---|---|
| 6,330,446 B1* | 12/2001 | Mori | 455/435.2 |
| 7,239,870 B2* | 7/2007 | Zhang et al. | 455/422.1 |
| 2004/0047324 A1* | 3/2004 | Diener | 370/338 |
| 2005/0197171 A1* | 9/2005 | Son et al. | 455/574 |
| 2006/0084444 A1* | 4/2006 | Kossi et al. | 455/450 |
| 2007/0207811 A1* | 9/2007 | Das et al. | 455/450 |
| 2007/0249341 A1* | 10/2007 | Chu et al. | 455/434 |
| 2008/0096542 A1* | 4/2008 | Chu et al. | 455/422.1 |
| 2009/0135744 A1* | 5/2009 | Chaudhri et al. | 370/278 |

* cited by examiner

*Primary Examiner* — Mahendra Patel

(57) ABSTRACT

This invention relates to a method for controlling location distribution of sensing nodes, selection of sensing nodes, control of sensing implementation and process of performing spectrum sensing in cognitive radio networks of open wireless architecture (OWA) systems. Specifically, the invention relates to an efficient and reliable method minimizing time overhead consumed during spectrum sensing with open wireless architecture (OWA).

18 Claims, 2 Drawing Sheets

Implementation Steps for Spectrum Sensing

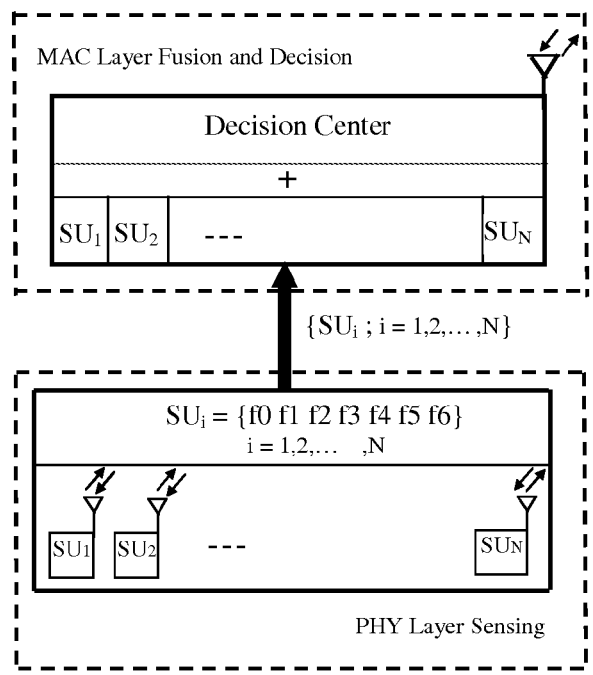
FIG.1: Proposed scheme for spectrum sensing
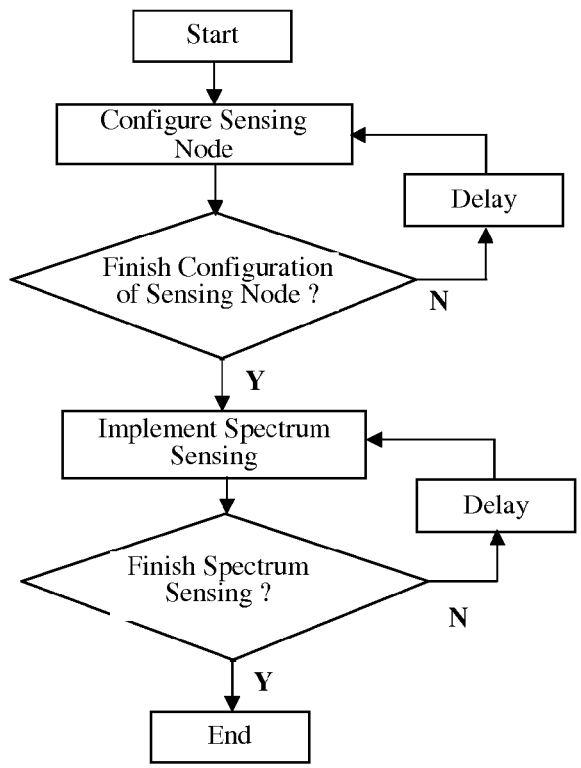
FIG.2: Implementation Steps for Spectrum Sensing

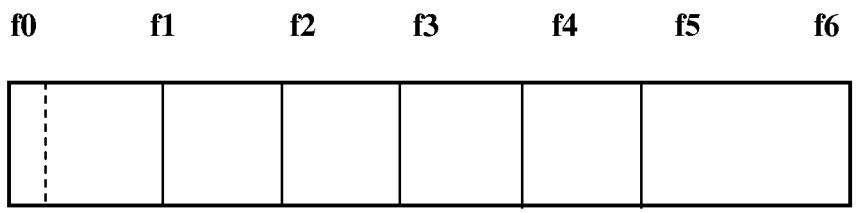
f0 f1 = 00, 01, 10 ( Sector affiliation )
f2 = 0, 1 ( Service Condition )
f3 = 0, 1 ( Type of Service )
f4 = 0, 1 ( Configuration Process of Sensing Node)
f5 = 0, 1 ( Process of Sensing )
f6 = 0, 1 ( Power of Sensed Signal )
FIG.3: Frame structure for spectrum sensing used at MAC layer

METHOD FOR SPECTRUM SENSING IN COGNITIVE RADIO NETWORKS WITH OPEN WIRELESS ARCHITECTURE

RELATED APPLICATION

This application claims the benefit of U.S. Provisional Application No. 61/485,632, entitled "METHOD FOR SPECTRUM SENSING IN COGNITIVE RADIO NETWORKS WITH OPEN WIRELESS ARCHITECTURE," filed on 13 May, 2011.

BACKGROUND OF THE INVENTION

1. Field of the Invention

The present invention relates to a method for controlling location distribution of sensing node, selection for sensing node, format design of sensing implementation and a procedure performing spectrum sensing in cognitive radio networks. Specifically, the invention relates to an efficient and reliable method that aims at minimizing time overhead consumed during spectrum sensing with open wireless architecture (OWA).

2. Related Arts

Present wireless services are often provided by following the fixed allocation of radio spectrum. This leads to the low spectrum utilization efficiency. Currently, the service providers are faced with a situation where they require a larger amount of spectrum to satisfy the increasing quality of service (QoS) requirements of the users. An efficient method for alleviating the problem is to adopt cognitive spectrum access. Spectrum sensing should be designed for performing measurements on a part of the spectrum and making a decision related to spectrum usage based upon the measured condition of the spectrum.

This has fostered the researches in unlicensed spectrum access, and spectrum sensing has been seen as an important enabler for this. In a scenario in which there exists a licensed user (primary user), any unlicensed (secondary) user needs to ensure that the primary user is protected, i.e., that no secondary user is harmfully interfering any primary user operation. Spectrum sensing can be used to detect the presence (or absence) of a primary user. Recently, FCC (federal communications commission) regulations have paved way for utilizing spectrum obtained from unused TV (television) channels, the so-called TV white spaces. In these regulations, spectrum sensing plays a major role.

Cognitive radio spectrum access is a feasible and powerful manner for solving the spectrum usage problem. Such radio devices should be capable of sensing spectrum occupancy, and, in conformity with the rules of the FCC, opportunistically adapting transmission to utilize empty frequency bands without disrupting primary user systems. However, this departure from traditional license-based spectrum allocation policies could disrupt existing systems if the spectrum utilization decision is based on unreliable spectral estimation.

Spectrum sensing as the focus of the present invention is the most important part for the establishment of cognitive radio link of wireless cellular networks or wireless access networks as secondary user system. This sensing task, often referred to as spectrum sensing, is a major aspect of cognitive radio and has the important effect on the spectrum utilization efficiency. Spectrum sensing is to achieve awareness about the spectrum usage and existence of primary users in a geographical area. This awareness can be obtained by using geolocation and database, or by local spectrum sensing at cognitive radios. There are some other solutions that can be thought of as alternatives, or complements, to spectrum sensing, such as using a database of (licensed) spectrum usage, which can be queried for spectrum opportunities, or advertising spectrum opportunities over a Cognition enabling Pilot Channel (CPC) as developed in the E2R (End-to-End Reconfigurability) and E3 (End-to-End Efficiency) projects of European Commission and in RRS (Reconfigurable Radio Systems) of ETSI (European Telecommunications Standards Institute).

Although it is possible to realize the unlicensed spectrum access by capturing the efficient spectrum opportunities, a problem arises due to the difficulty in obtaining both the accuracy of spectrum sensing and the minimization of the related time overhead. This is particularly critical when considering the mobility of sensing node having the limited hardware resource. In addition, since the complexity increases as the number of sensing nodes increases, a compromise should be pursued in sensing process that takes both the number of sensing node and the accuracy of sensing result into account.

One possible approach to increase the spectral estimation reliability and decrease the probability of interference of cognitive radios to existing radio systems is by spectrum sensing. In such a distributed approach, the spectrum occupancy is determined by the joint sensing of multiple cognitive radio nodes, instead of being determined individually by each cognitive radio node.

In application scenarios involving geographically distributed radios, such as a wireless cellular system, distributed spectrum sensing approaches are worth considering due to the variability of the radio signal. Such methods can efficiently increase the reliability of the spectrum estimation process, at the expense of computational complexity and power/bandwidth usage for the transmission of spectrum sensing information.

Being a key enabling functionality in cognitive radio networks, spectrum sensing needs to reliably detect weak primary radio (PR) signals of possibly-unknown types. Spectrum sensing should be cable of monitoring the activation of primary users in order for the secondary users to vacate the occupied spectrum segments. However, it is difficult for a cognitive radio to capture such information instantaneously due to the absence of cooperation between the primary and secondary users. Thus, recent research efforts on spectrum sensing have focused on the detection of ongoing primary transmissions by cognitive radio devices. Generally, radio spectrum detection methods fall into three categories: energy detection, coherent detection, and cyclostationary feature detection.

If the secondary user has limited information on the primary signals (e.g., only the local noise power is known), then the energy detector is optimal. When certain primary signal features are known to the cognitive radios (CRs) (such as pilots, preambles, or synchronization messages), the optimal detector usually applies the matched filter structure to maximize the probability of detection. Additionally, cyclostationary feature detectors differentiate the primary signal energy from the local noise energy by exploiting certain periodicity exhibited by the mean and autocorrelation of a particular modulated signal.

Regardless of primary signal features, it is necessary for secondary user system to obtain the accurate and reliable occupancy of the spectrum utilization while the resource overhead used during sensing can be minimized. In wireless cellular networks, spectrum sensing can be realized by either base station (BS) or by mobile users with mobile devices. The reliable sensing process can be achieved by BS due to its powerful hardware resource and computation ability. However, the fixed location of BS can not always guarantee the higher reliability of sensing results because wireless signal energy fades as the transmission distance increases. Primary user node has the randomness in both the location distribution and the condition of service link, which makes it more difficult to efficiently and reliably obtain the occupancy of the spectrum. By considering both the difficulties in sensing process and the fixed sensing ability of mobile user, the present invention aims at increasing the efficiency and reliability of sensing process by alleviating the effect caused by the randomness of both the location of spectrum utilization and the spectrum signal energy on the reliability of sensing result.

Schemes on user-cooperation for primary spectrum sensing are studied in [S. M. Mishra, et al, "Cooperative Sensing among Cognitive Radios," in *IEEE International Conference on Communications*, ICC 2006, vol. 4, pp. 1658-1663, June 2006.] and [E. Visotsky, et al, "On Collaborative Detection of TV Transmissions in Support of Dynamic Spectrum Sharing," in *First IEEE International Symposium on New Frontiers in Dynamic Spectrum Access Networks*, DySPAN 2005, pp. 338-345, November 2005], where some kind of joint detection is utilized among all the cooperating users. Gathering the entire received data at one place is very difficult due to practical wireless communication constraints. In practice, cooperation between the cognitive radio users cannot always be feasible in general since a user can cooperate with others only when there are other users in its vicinity monitoring the same frequency band as itself. Another feasible system is the hard-decision strategy considered in [A. Ghasemi, et al, "Collaborative spectrum sensing for opportunistic access in fading environments," in *First IEEE International Symposium on New Frontiers in Dynamic Spectrum Access Networks*, DySPAN 2005, pp. 131-136, November 2005], where the individual secondary user independently makes decisions about the presence of the frequency band that are being monitored and transfer their decisions to a fusion center. The final decision about the occupancy of the band is made at the fusion center by fusing the decisions made by all cooperating users in that area that were monitoring the same frequency band.

In cooperating spectrum sensing, the fusion center has the centralized management function that controls the channel assignment and scheduling for the secondary users. It can be realized at the fusion center that the secondary users exchange their information including sensing decisions and geographic locations and the correlation between the observations.

Fusion of data observed at distributed locations is an integral part of any decentralized detection procedure. However, most of the significant works on decentralized detection have been tremendously limited on the cases with conditionally observations only. The correlated case has also been studied, but the results are often not very easy to implement in practice as described in [E. Drakopoulos, et al, "Optimum multisensor fusion of correlated local decisions," *IEEE Trans. Aerospace and Electronic Systems*, vol. 27, no. 4, pp. 5-14, July 1991]. Since the cooperating secondary users are expected and limited to be located close to each other and are monitoring the same frequency band, the distributions of the received powers they see can be modeled as being identical, albeit not independent. So the problem now becomes a binary hypothesis testing problem to decide whether or not the received mean power at their location is higher than the power expected at the outer edge of the protected region.

Detecting a spectrum hole in a wideband spectrum involves two major challenges. First, the spectrum holes are spread across the wideband spectrum and their availability status changes rapidly. Therefore, the secondary users should be agile enough to detect the holes within a period considerably shorter than the entire duration of its vacancy. Secondly, in order to avoid harming the communication of the primary users, the secondary users must distinguish the holes from the channels occupied by the primary users reliably, irrespective of how weak the transmissions of the primary users are.

When designing spectrum sensing scheme that quickly and reliably realizes the spectrum sensing, irrespective of how weak the transmissions of the primary users are and how distributed the transmissions of the primary users spatially are, the adaptation to this must be satisfied in order to obtain the reliable sensing process while minimizing the time overhead consumed during spectrum sensing.

In addition, all of the aforementioned references are limited to the specific wireless standard or carrier only for the primary users, rather than supporting multiple wireless standards or different radio transmission technologies. Hence, the primary network of the aforementioned references is in closed wireless architecture.

SUMMARY OF THE INVENTION

An object of the invention is to overcome the effect of the weak transmission signal of primary user on the reliability of sensing process.

Thus, the method is needed for controlling the configuration of sensing node comprising both the total number of sensing nodes and the spatial location of each sensing node. The method comprises the steps of sensing which frequency band by which sensing node, determining a cooperative sensing by using the multiple selected sensing nodes. Each secondary user is selected as one of sensing nodes depending on its current service condition (active, or idle). If one secondary user is idle, then it may be selected as one sensing node. Otherwise, it is not selected to complete sensing task. A secondary user is selected as sensing node to fulfill local spectrum utilization sensing with a local sensing result that serves as one part of the final sensed signals fused at decision center.

Another object of the invention is to overcome the effect of using too many sensing nodes for the efficiency of sensing process.

Hence, the method is needed for controlling the total number of sensing nodes depending on how to select sensing node according to the spatial distribution of primary user. A tradeoff between the number of sensing nodes and the accuracy of sensing process is controlled by selecting each sensing node according to its local user density distribution. The location distribution of sensing nodes is not fixed due to the dynamic location distribution of transmission link of primary user. Since this is practical dynamic property, a simple and efficient method is to place more sensing nodes in the region where the sensed signal is weaker. The number of sensing nodes is updated based on the statistical signal estimation during the specified time scale factor.

In general, the present invention can be applied into any type of secondary user system. When secondary system is wireless cellular networks, the method for controlling the configuration of sensing node is based on the user condition of each sector to determine both the number of sensing nodes and the spatial location of each sensing node. The method comprises the steps of sensing which frequency band by which sensing node in which sector, determining a cooperative sensing by using the multiple selected sensing nodes. Each secondary user is selected as one of sensing nodes depending on its current service condition (active or idle). If one secondary user is idle, then it may be selected as one of sensing nodes. Otherwise, it may not be selected to complete sensing task. A secondary user is selected as sensing node for detecting the spectrum utilization of local sector in order to obtain a local spectrum utilization condition that serves as one part of the total sensing information fused in decision center in base station (BS).

If applied to wireless cellular networks, another goal of the present invention is to control the total number of sensing nodes by selecting sensing node according to the spatial distribution of primary user in each sector. A trade-off between the number of sensing nodes and the accuracy of sensing process is realized by setting the location of sensing node according to user density distribution of each sector. The location distribution of sensing nodes is not fixed due to the dynamic location distribution of transmission link of primary user. Since this is practical dynamic property, a simple and efficient method is to place more sensing nodes in the sector where the sensed signal is weaker. The number of sensing nodes of each sector is updated based on the statistical signal estimation during the specified time scale factor.

The region for sensing the same frequency band is generally divided into several different areas in order to achieve the high efficiency and reliability of the sensing process by taking the location dependence of radio transmission link quality into consideration. In addition, the time overhead used in the sensing process is minimized by selecting sensing node according to service condition and location distribution. The performance of sensing process is improved as the number of sensing nodes with different sensing results increases.

The present invention focuses on the application in wireless cellular networks where the cell for sensing the same frequency band is divided into three sectors, with one base station located at the center of the cell responsible for the decision on cooperative sensing result. When the signal of the sensed frequency band is weak, multiple cells joint sensing is used to increase the reliability of sensing result in the local region. The priority of being sensing node of secondary user is according to both the service condition and the type of services. It is completed by BS by checking each secondary user using the dedicated channel. When there are multiple users with the same priority, the distribution of location condition of secondary user is used as the measurement of selecting sensing nodes. Large difference between different sensing locations can increase the reliable sensing links due to the local dependence of radio signal. Thus, the space location distribution of secondary user is considered for selecting sensing nodes.

The frame for sensing process includes region indication, user condition, type of service, process of configuring sensing node (or configuration process of sensing node), process of sensing implementation, and condition of signal (or power of signal) in sensed frequency band. When applied to wireless cellular networks, the region indication is expressed by sector index. These indications are obtained by BS using the dedicated channel. The task for sensing process is implemented at MAC (medium access control) layer after obtaining the above indications. An algorithm is needed for implementing the sensing process that is based on the combination of the distributed condition information collected and the centralized decision on sensing result.

Each sensing node completes local sensing task, with the sensing result transmitted to the decision center. The sensing process of each sensing node is controlled by the decision center in BS that organizes all sensing nodes within the cell to implement the synchronization process for sensing the same frequency band, as a result, increasing the probability of obtaining the correct sensing result.

The interference by primary users can be improved when the transmission power over cognitive spectrum channel is decreased by secondary user using better channels. Hence, the lower efficiency of the channel could be caused because a secondary user with the shorter length of data queue utilizes channels being in better condition and the trade-off between channel condition and queue length should be considered jointly while designing a spectrum allocation scheme.

Realizing cognitive spectrum access comprises two steps: spectrum sensing and link access. When driven by the requirement for frequency band, the management center in BS begins spectrum sensing task. Firstly, the traffic condition of the cell is estimated by low pass time window. The trade-off between queuing delay and channel efficiency is controlled according to match ability (MA) that considers the joint effect of queuing delay and match ability on the average delay of secondary user system.

The present invention deals with physical layer sensing (PHY layer sensing) and MAC layer sensing. The decision on sensing result is based on the combination of PHY layer sensing and MAC layer sensing. This is realized by two steps.

Firstly, MAC layer sensing is performed by including the control for location distribution of sensing node and the selection of sensing node. It concentrates on how to schedule secondary user for efficient discovery of spectrum opportunities, especially in the case of multiple channels and multiple secondary users. Important issues associated with MAC layer sensing in secondary user system are how often to sense the availability of licensed channels, in which order to sense, and how long a sensing period should be.

Secondly, the spectrum signal sensing at PHY layer is performed by being controlled by the sensing scheduling at MAC layer. In this stage, each sensing node completes local sensing task, with the sensing result transmitted to the decision center in BS. PHY layer sensing focuses on how to detect the presence of primary signals rapidly and robustly. It is accomplished by using or not using the parameters of the primary signals such as transmission power, waveform, modulation schemes. Coherent detection using a matched filter would be ideal for spectrum sensing since it maximizes the received signal-to-noise ratio. In practice, coherent detection is often applied to known pilot signals. However, coherent detection requires a prior knowledge of primary signal at both PHY and MAC layers, such as modulation scheme, pulse shape and packet format. Moreover, for demodulation, it has to be synchronized with primary signal in timing and carrier frequency. Therefore, it is very vulnerable to uncertainty and changes in the primary signal and the timing and frequency offset. Furthermore, a different detector is required in order to detect each primary user.

In summary, the present invention is based on a decision and control approach that integrates the scheduling for the selection of sensing node at the MAC layer with spectrum sensing at the physical (PHY) layer. It can be combined with traffic statistics determined by the application layer of the secondary (unlicensed) network. It can easily incorporate sensing error and collision constraint on the primary users. The sensing process of each sensing node is controlled by the decision center in BS that organizes all sensing nodes within the cell to implement the synchronization process for sensing the same frequency band, as a result, increasing the probability of obtaining the correct sensing result. The trade-off depends on multiple parameters and deals with the joint consideration of the control for the service arrival rate, the channel access and the global fairness trade-off. This is accomplished by MAC layer sensing.

Spectrum sensing is the most important part of the cognitive radio networks, and dynamic spectrum sensing and open spectrum management require Open Wireless Architecture (OWA) technology for the optimization in both the wireless systems and wireless transmissions.

Open Wireless Architecture (OWA) covers mostly on the MAC and PHY layers which are the main layers of the present invention. OWA enables the mobile user to seamlessly connect to and synchronize with different wireless networks, either primary network or secondary network.

Open Wireless Architecture (OWA) technology is one optimal solution for the Fourth Generation wireless and mobile communications (4G) and Beyond on the worldwide basis. OWA refers to the open broadband wireless platform that can support diverse wireless and mobile standards, and can converge multiple wireless networks. To achieve this flexibility, OWA focuses on all aspects of a communication system including RF (radio frequency), baseband processing, networking and application segments. The flexibility and adaptability required for the converged open wireless platform can be achieved by defining the open interface parameters for the OWA systems and networks.

OWA helps in realizing global roaming facilities and seamless networking capabilities amongst different radio transmission technologies. It allows the network operators and subscribers to use third party solutions or user-defined solutions on their systems and to customize their systems according to their business models. Using OWA we can build systems which support multiple standards, multiple bands, multiple modes and offer diverse services to the customers.

OWA is different from SDR (software defined radio) as OWA basically maps various wireless standards into open interface parameters and maintain the system platform including RF, baseband, networks and applications an open architecture. Hence, in OWA systems, different modules (both hardware and software) can be from different vendors. It is similar to the open computer architecture in personal computer system and open network architecture in packet router system.

However, SDR is primarily a radio in which the preset operating parameters including inter alia frequency range, modulation type, and/or output power limitations can be reset or altered by software in order to support different radio frequency bands and/or standards. Though SDR has been improved a lot to support re-configurability and flexibility, it is a closed architecture in coupling different radios into one broadband transceiver. In other words, SDR consumes much more power and spectrum in exchange of the system flexibility. From the business point of view, SDR is not a cost-effective solution in commercial wireless communications.

Furthermore, SDR uses broadband transceiver to support multiple wireless standards which is very expensive in the commercial environment. However, OWA converges multiple air interfaces in an open system platform to maximize the transmission bandwidth and system performance, but each wireless transmission still uses the narrowband transceiver, therefore maintaining the system in a cost-effective way which is very important for the commercial business.

By using OWA technology, we can converge multiple wireless standards in one open system to support both broadband high-speed radio transmission and seamless fast mobility capability in a mobile fast-fading propagation model environment while maintaining the very high mobile network capacity for the commercial mobile business.

In addition, OWA allows allocating multiple air interfaces into an external card so that the users can simply change wireless standards by updating such air interface card without having to change the mobile terminal device or terminal system.

Our mobile research results tell us when the transmission bandwidth is enough, the information processing consumes much more resources and energies than the transmission processing in the mobile terminal system. If we can reduce the processing burdens in the mobile terminal including baseband signal processing, application processing and networking processing, the overall system resources and power can be tremendously minimized and the system can be simplified.

The aforementioned OWA technology platform has secured enough transmission bandwidth by converging multiple wireless standards (including wireless cellular and wireless access networks) in one common platform with dynamic spectrum sensing technology so that the mobile terminal can be optimized for best-of-effort high-speed transmission.

To support the OWA-based multiple wireless interfaces (or called Radio Transmission Technologies—RTTs) for the common wireless terminal, the radio spectrum utilization can be dynamic and eventually be open for the future mobile wireless communications.

The OWA-based spectrum sensing can improve the future mobile networks from the traditional carrier-centric infrastructure to the future user-centric infrastructure.

The OWA spectrum sensing architecture of the present invention is a revolutionary approach in developing the next generation mobile wireless communications based on the OWA technology platform with dynamic spectrum utilization which basically discloses the following several major inventions for the future mobile wireless communications:

1. OWA enables the high-efficient dynamic spectrum sensing and open spectrum management for the future radio systems and radio transmissions,
2. OWA provides multiple wireless transmissions solution without relying on the broadband transceiver,
3. OWA provides broadband high-speed transmission while securing seamless mobility capability,
4. OWA provides cost-effective and spectrum-efficient mobile cloud solutions by introducing the dynamic and fast spectrum sensing techniques for the cognitive radio networks and systems,
5. OWA shifts the traditional carrier-centric service architecture to the future user-centric service delivery infrastructure.

In other aspects, the present invention provides a system and a method with features and advantages corresponding to those discussed above.

BRIEF DESCRIPTION OF THE DRAWINGS

For the full understanding of the nature of the present invention, reference should be made to the following detailed descriptions with the accompanying drawings in which:

The proposed scheme for spectrum sensing of secondary user system is schematically shown in FIG. 1.

FIG. 2 is a flow chart illustrating the implementation steps of the spectrum sensing and fusion decision in decision center.

FIG. 3 is frame structure for spectrum sensing used at MAC layer that consists of seven bits, indicating sector affiliation (sector index), service condition, type of service, configuration process of sensing node, process of sensing, and power of sensed signal respectively.

Like reference numerals refer to like parts throughout the several views of the drawings.

DETAILED DESCRIPTION OF THE INVENTION

The following specification for the implementation of the present invention is made based on the attached drawings.

FIG. 1 shows schematically a block diagram of spectrum sensing for secondary user system according to one embodiment of the present invention. Each sensing node completes local sensing of specified spectrum, with the sensing result transmitted to the decision center. The sensing process of each sensing node is controlled by the decision center in BS that organizes all sensing nodes within the cell to implement the synchronization process for sensing the same frequency band, as a result, increasing the probability of obtaining the correct sensing result.

The method for spectrum sensing is based on a decision and control approach that integrates the scheduling for the selection of sensing node at the MAC layer with spectrum sensing at the physical layer. The sensing result of each sensing node is collected by the fusion decision center in BS that organizes all sensing nodes within the cell to implement the synchronization process for sensing the same frequency band, as a result, increasing the probability of obtaining the correct sensing result. It can be combined with traffic statistics determined by the application layer of the secondary network. It can easily incorporate sensing error and collision constraint on the primary users.

The process of spectrum sensing within a cell is controlled by fusion and decision center in BS. Before the sensing task is started, the selection of sensing node needs to be made that is based on joint consideration of the current user condition (active or idle) and the type of service (delay-sensitive or non-delay-sensitive) to select each sensing node. The priority for selecting sensing node is divided into four levels, each denoted by 2 bits, f2 and f3. For each secondary user, active and idle condition are represented by letting f2 be 1 and 0 respectively and delay-sensitive and non-delay-sensitive service are denoted by making f3 be 1 and 0 respectively. It is considered in setting priority order that the efficiency of sensing process of each secondary user can be affected by its current service condition due to the limited hardware resource and computation capability. Hence, each secondary user can be in one of four conditions, 00, 01, 10, and 11 that are first, second, third, and fourth priority level respectively. The sector affiliation (sector index) of each user is indicated using 2 bits, f0 and f1. The location of sensing node is obtained by fusion decision center in BS by checking f0 and f1. Configuration process of sensing node, process of sensing, and power of signal, denoted by f4, f5, and f6 respectively, are three factors provided to the fusion decision center in BS. Based on multiple sensing results, the decision center makes the final decision on the utilization condition of the sensed frequency band of primary user system.

The sensing process implemented in decision center is divided into four phases:
Estimating (Prediction of Traffic),
Configuring (Configuration of Sensing Node),
Sensing (Implementation of Spectrum Sensing), and
Fusion and Decision (Fusion of Sensing Results and Final Decision on Sensed Spectrum).
(a) Estimating
In this phase, the following several parameters need to be denoted.
$T_s$: The length of time slot,
$T_w$: The length of time window,
$\lambda_i$: The average arrival rate of user i,
$A_i[n]$: The total amount of bits arriving of user i during $(0, nT_s]$, $$\rho_w: \rho_w = \frac{T_s}{T_w},$$

$Q_i[n]$: The amount of bits in buffer in BS of user i at time $nT_s$,
$\overline{Q}_i[n]$: The average queue length of user i in its buffer in BS at time $nT_s$.

The traffic condition in terms of the average queuing delay in time slot n, $W_i[n]$, is estimated by decision center using the time window with the low pass property:

$$W_i[n] = \frac{\overline{Q}_i[n]}{\lambda_i} \tag{1}$$

The average waiting time of user i in time slot n+1 is predicted by $$W_i[n+1] = (1-\rho_w)\frac{\overline{Q}_i[n]}{\lambda_i} + \rho_w \frac{Q_i[n]}{\lambda_i} + \rho_w T_s - \rho_w \frac{T_s r_i[n]}{\lambda_i} \tag{2}$$
$$= (1-\rho_w)W_i[n] + \rho_w \frac{Q_i[n]}{\lambda_i} + \rho_w T_s - \rho_w \frac{T_s r_i[n]}{\lambda_i}$$

The average waiting time in a cell including N user in time slot n+1 is estimated using $$\overline{W}[n+1] = \frac{1}{N}\sum_{i=1}^{N} W_i[n+1] \tag{3}$$

The configuration of sensing node is started according to the comparison between $\overline{W}[n+1]$ and the specified threshold of the average queuing delay, $W_{threshold}$. If $\overline{W}[n+1] \geq W_{threshold}$, then start the configuration of sensing node.
(b) Configuring
In this phase, four parameters, f0, f1, f2, and f3, are key for the configuration of sensing node.

Firstly, the sensing region (the cell) is divided into several small areas (three sectors), each placed with some sensing nodes, in order to utilize the radio signal space diversity most efficiently for the reliable fusion and decision of sensing results. Secondly, the limited hardware resource and computation capability of secondary user node is taken into account when designing the priority order for selecting sensing node. The priority order is defined by using f2 and f3 (f2∈{0, 1}; f3∈{0, 1}).
First Level: f2f3=0 0,
Second Level: f2f3=0 1,
Third Level: f2f3=1 0,
Fourth Level: f2f3=1 1.
Method One for Example
By the above definition, the method for selecting one sensing node between $S_i$ and $S_j$, is
Step 1: If the f2 of $S_i$ is not equal to the f2 of $S_j$, then go to step 2. Otherwise, switch to step 3.
Step 2: Select the user satisfying $\min\{f_2\}$ as sensing node.

Step 3: If the f3 of $S_i$ is not equal to the f3 of $S_j$, then go to step 4. Otherwise, switch to step 5.

Step 4: Select the user satisfying min$\{f_3\}$ as sensing node.

Step 5: Select one user between $S_i$ and $S_j$ randomly as sensing node.

The sector affiliation (sector index) of each user in a cell is indicated by using 2 bits, f0 and f1. The location of sensing node is obtained by fusion decision center in BS by checking f0 and f1. A cell is divided into three sectors denoted by f0 and f1.

Sector 1: f0f1=0 0.
Sector 2: f0f1=0 1.
Sector 3: f0f1=1 0.

In the above situation, as a special application, the sensing region, the cell is divided into three small areas called three sectors. In each sector, some sensing nodes need to be placed in order to take advantage of the radio signal space diversity for the reliable fusion and decision of sensing results. When there is no user's sensing node in a sector, the minimum distance rule is observed for the configuration of sensing node that the additional sensing nodes are placed in most neighboring area. In this situation, the selection of sensing nodes is completed by the aforementioned Method One. When there is no user's sensing node in larger region where it is hard to select sensing node, the joint sensing of multiple cells is used that the final decision on sensing result is based on the fusion of multiple sensing results from multiple decision centers located in multiple different cells.

(c) Sensing

The control for sensing process and the decision on final sensing result is completed by decision center in BS that includes the control for location distribution of sensing node and the selection of sensing node. In the software process implementation, this task is implemented at MAC layer. The steps of implementation are shown in FIG. 2. However, the completion of the practical sensing task needs the combination of the sensing scheduling at MAC layer and the spectrum signal sensing at PHY layer, a cross-layer cooperation implementation scheme. The steps of implementation are:

Step 1: Start sensing process,
Step 2: Configure sensing node,
Step 3: Implement spectrum sensing, and
Step 4: End sensing process.

In wireless cellular networks, the sensing process is driven by the comparison between $\overline{W}[n+1]$ and the specified threshold of the average queuing delay, $W_{threshold}$. If $\overline{W}[n+1] \geq W_{threshold}$, then the sensing process is started (Task at MAC layer).

The sensing cell is divided into three sensing sectors. Each sector needs to be placed with some sensing nodes in order to achieve the sensing gain from the radio space diversity.

Secondly, the limited hardware resource and computation ability of secondary user node is taken into account when designing the priority order for selecting sensing node. The priority level distribution is obtained in decision center by checking f2 and f3 of each user (Task at MAC layer), as set forth above.

The sensing for frequency bands of primary user system is completed by the selected sensing nodes. Each sensing node completes local sensing task, with the sensing result transmitted to the decision center in BS (Task at PHY layer). In this process, each sensing node focuses on obtaining the primary signals rapidly and robustly. It is accomplished by using or not using the parameters of the primary signals (transmission power, waveform, modulation schemes). This can be controlled by decision center in BS.

Sensing process is ended by checking the f5 of each sensing node. When each sensing node adopts the same detection method, the time window of the shorter length is used to decrease time overhead. If different sensing nodes use different detection methods, the time window length should be increased in order to guarantee the reliability of sensing process. The time window length is updated for the reliable synchronous sensing process. The shorter time window length is more efficient for the identification of the sensed spectrum. However, it can decrease the reliability of the sensing result. Thus, the trade-off should be considered for the better performance in both the efficiency and the reliability.

In conclusion, the detailed description of the present invention comprises:

1. An open wireless architecture (OWA) system scheme for spectrum sensing for secondary user system in cognitive radio networks comprises the selection of sensing node, the configuration for the location of each sensing node, the sensing frame for the control of sensing process, and the division of the sensing region. The configuration of sensing node is based on the node selection and the locating place in different divided small sensing areas. When it is applied to wireless cellular networks, this scheme is based on the selection and setting location in several different sectors and the collection of sensing information and decision on the final sensing result is completed by BS.

2. The priority for selecting sensing node is divided into four levels, each denoted by 2 bits, f2 and f3 in sensing frame. For each secondary user, active or idle condition is represented by letting f2 be 1 or 0 respectively, and delay-sensitive or non-delay-sensitive service is denoted by making f3 be 1 or 0 respectively. Each secondary user can be in one of four conditions, 00, 01, 10, and 11 that are first, second, third, and fourth priority level respectively.

3. The control for sensing process and the decision on final sensing result are completed by decision center in BS that includes the control for location distribution of sensing node and the selection of sensing node. The software process implementation for this task is implemented at MAC layer. The completion of the practical sensing task is based on the combination of the sensing scheduling at MAC layer and the spectrum signal sensing at PHY layer, a cross-layer cooperation implementation scheme.

4. The spectrum sensing scheme comprises the method as to which frequency band is sensed by which sensing node. It is a cooperative sensing mechanism by using the multiple selected sensing nodes. Each secondary user is selected as one of the sensing nodes depending on its current service condition (active or idle). If one secondary user is idle, then it may be selected as one sensing node. Otherwise, it is not selected to complete sensing task. A secondary user is selected as sensing node to fulfill local spectrum utilization sensing with a local sensing result that serves as one part of the final sensed signals fused at decision center.

5. The sensing frame includes region indication, user condition, type of service, process of configuring sensing node, process of sensing implementation, and condition of signal in sensed frequency band. When applied to wireless cellular networks, the region indication is expressed by sector index. These indications are obtained by BS using the dedicated channel.

6. The sensing process of each sensing node is controlled by the decision center in BS that organizes all sensing nodes within the cell to implement the synchronization process for sensing the same frequency band, as a result, increasing the probability of obtaining the correct sensing result.

7. The method for spectrum sensing is based on a decision and control approach that integrates the scheduling for the selection of sensing node at the MAC layer with spectrum sensing at the physical layer.
8. The sensing result of each sensing node is collected by the fusion decision center in BS that organizes all sensing nodes within the cell to implement the synchronization process for sensing the same frequency band.
9. The spectrum sensing scheme can be combined with traffic statistics determined by the application layer of the secondary user system. It can incorporate sensing error and collision constraint on the primary users, as a result, forming the joint sensing scheme of PHY layer for spectrum sensing, MAC layer for sensing scheduling, and Application layer for traffic control.
10. The configuration of sensing node is started according to the comparison between the average waiting time in a cell in time slot n+1, $\overline{W}[n+1]$ and the specified threshold of the average queuing delay $W_{threshold}$. If $\overline{W}[n+1] \geq W_{threshold}$, then start the configuration of sensing node.
11. Configuration process of sensing node, process of sensing, and power of signal, denoted by f4, f5, and f6 respectively, are three factors provided to the fusion decision center in BS. Based on multiple sensing results, the decision center makes the final decision on the utilization condition of the sensed frequency band of primary user system.
12. The process of spectrum sensing within a cell is controlled by fusion and decision center in BS. Before the sensing task is started, the selection of sensing node is completed based on joint consideration of the current user condition (active or idle) and the type of service (delay-sensitive or non-delay-sensitive) to select each sensing node.
13. As a special application in wireless cellular networks, the cell is divided into three small areas called three sectors. In each sector, some sensing nodes need to be placed in order to take advantage of the radio signal space diversity for the reliable fusion and decision of sensing results.
14. When there is no user's sensing node in a sector, the additional sensing nodes are placed in most neighboring area based on the minimum distance rule.
15. When there is no user's sensing node in large region where it is hard to select sensing node, the joint sensing of multiple cells is used so that the final decision on sensing result is based on the fusion of multiple sensing results from multiple decision centers located in different cells.
16. The aforementioned Base-Station (BS) can be any wireless network equipment such as gateway, switch center, router and other network system connecting both the backbone networks and the wireless mobile terminals or devices.
17. The aforementioned primary user and secondary user can be dynamically switched, shifted or changed in various different networking environments or service areas.
18. The aforementioned decision center and/or control center of spectrum sensing can be located in the BS, the switching center, the gateway, the router, as set forth above, or a Virtual Mobile Server, or a mobile cloud server, or a Virtual networking system, but not limited thereto.
19. The aforementioned spectrum sensing control can be located in the aforementioned BS, the aforementioned gateway, the aforementioned router, but not limited thereto, or the aforementioned mobile terminal device, or collaborated each other among the aforementioned various systems.
20. The aforementioned spectrum sensing technology can be applied to mobile cellular networks, wireless local area networks (WLAN), wireless personal access networks (WPAN), Broadband Wireless Access systems and networks (BWA), but not limited thereto, and also be applied to the converged networks of the aforementioned various wireless networks.

The aforementioned primary user networks and secondary user networks can be wireless cellular networks, wireless local area networks (WLAN), wireless personal access networks (WPAN), broadband wireless access systems and networks (BWA), wireless metropolitan area networks (WMAN), as set forth above, and converged wireless networks of multiple different wireless standards.

Open Wireless Architecture (OWA) enables open spectrum management with spectrum sensing in cognitive radio networks for various different wireless standards and radio transmission technologies which totally converge wireless access networks and mobile cellular networks into open mobile cloud infrastructure powered by OWA® open platform.

OWA based spectrum sensing technology can greatly increase the spectrum utilization efficiency by introducing the secondary user of unlicensed spectrum utilization to the primary user of licensed spectrum utilization, which enormously optimize the available frequency spectrum for the wireless service area.

Open Wireless Architecture (OWA) enables Cognitive Radio to respond quickly to various different wireless standards or radio transmission technologies for the primary user of licensed spectrum, and to adapt efficiently to specific frequency spectrum for the secondary user of unlicensed utilization.

The system and method of the present invention are not meant to be limited to the aforementioned experiment and implementation.

Many modifications and other embodiments of the present invention set forth herein will come to mind to one ordinary skilled in the art to which the present invention pertains having the benefit of the teachings presented in the foregoing descriptions. Therefore, it is to be understood that the present invention is not to be limited to the specific examples of the embodiments disclosed and that modifications, variations, changes and other embodiments are intended to be included within the scope of the appended claims. Although specific terms are employed herein, they are used in a generic and descriptive sense only and not for purposes of limitation.

What is claimed is:

1. An Open Wireless Architecture (OWA) spectrum sensing method for secondary user of spectrum in cognitive radio networks, said method comprising selection of sensing node, configuration for location of each said sensing node, sensing frame for control of sensing process, and division of sensing region, wherein configuration of said sensing node is based on node selection and node location in different divided small sensing areas, and implementation of said sensing process is based on both sensing scheduling and spectrum signal sensing, and wherein priority for said selection of sensing node is divided into fourth levels, each denoted by two bits, f2 and f3 in said sensing frame, and for each said secondary user, active or idle condition is represented by letting f2 be 1 or 0 respectively, and delay-sensitive or non-delay-sensitive service is denoted by making f3 be 1 or 0 respectively, so that each said secondary user can be in one of four conditions, 00, 01, 10 and 11 that are first, second, third and fourth priority level respectively, wherein said selection of sensing node is completed based on joint consideration of current user condition (active or idle) and type of service (delay-sensitive or non-delay-sensitive) to select each said sensing node before sensing task is started.

2. The method as recited in claim 1, wherein said control of sensing process comprises decision on final sensing result for said secondary user and utilization condition of sensed frequency band of primary user, implemented in a decision center in base-station (BS) within a cell, comprising three factors of configuration process of sensing node, process of sensing implementation and condition of signal, denoted by f4, f5 and f6 respectively.

3. The method as recited in claim 2, wherein said decision center further manages control for location distribution of said sensing node and said selection of sensing node of sensing scheduling based on said sensing frame at medium access control layer and spectrum signal sensing at physical layer which is a cross-layer cooperation process.

4. The method as recited in claim 2, wherein said primary user refers to licensed user of spectrum, and said secondary user refers to unlicensed user of spectrum.

5. The method as recited in claim 1, wherein said sensing frame comprises region indication, said user condition, said type of service, said configuration process of sensing node, said process of sensing implementation and said condition of signal in sensed frequency band, wherein said region indication is represented by sector index when applied to wireless cellular networks, and said region indications are obtained by said BS by using dedicated channel.

6. The method as recited in claim 1, wherein said sensing process of each said sensing node is controlled by said decision center in said BS that organizes all said sensing nodes within said cell to implement synchronization process for sensing the same frequency band, as a result, increasing probability of obtaining correct sensing result of said sensing node collected by said decision center in said BS.

7. The method as recited in claim 1, wherein said spectrum sensing can be combined with traffic statistics determined by application layer of said secondary user system to form joint sensing scheme of physical layer for spectrum signal sensing, medium access control layer for sensing scheduling with said sensing frame and said application layer for user traffic control.

8. The method as recited in claim 3, wherein said cell is divided into three small areas called three sectors, and in each said sector, some said sensing nodes need to be placed in order to take advantage of radio signal space diversity for reliable fusion and decision of sensing results when said primary user network is a wireless cellular network, wherein said sector index of each user in said cell is indicated by using two bits, f0 and f1.

9. The method as recited in claim 8, wherein additional said sensing nodes are placed in most neighboring area based on the minimum distance rule when there is no user's said sensing node in a said sector.

10. The method as recited in claim 8, wherein, when there is no user's said sensing node in large region where it is hard to select said sensing node, joint sensing of multiple cells is used so that a final decision on sensing result is based on fusion of multiple said sensing results from multiple said decision centers located in different said cells.

11. The method as recited in claim 2, wherein said BS can be any wireless network equipment including gateway, switching system, router and other networking system connecting both backbone networks and wireless mobile terminals or devices.

12. The method as recited in claim 2, wherein said decision center is also a control center of spectrum sensing which can be located in said BS, a switching center, a network gateway, a network router, a virtual mobile server, a virtual networking system or a mobile cloud server.

13. The method as recited in claim 2, wherein said primary user networks and said secondary user networks can be wireless cellular networks, wireless local area networks (WLAN), wireless personal access networks (WPAN), broadband wireless access systems and networks (BWA), wireless metropolitan area networks (WMAN) and converged wireless networks of multiple different wireless standards.

14. The method as recited in claim 2, wherein said sensing process implemented in said decision center further comprises:
   a) Estimation and prediction of traffic condition based on comparison between average queuing delay of users and average waiting time in a cell for users,
   b) Configuration of said sensing nodes based on four parameters of said f0, said f1, said f2 and said f3 including said priority level and said sector index,
   c) Implementation of said spectrum sensing, including starting said sensing process, reconfiguring said sensing nodes, implementing said spectrum sensing and completing said sensing process based on medium access control layer process and physical layer process, and
   d) Fusion of sensing results and final decision on sensed spectrum.

15. The method as recited in claim 14, wherein said configuration of sensing node is started when said average waiting time in said cell in certain time slot is bigger than specified threshold of said average queuing delay for said sensing node.

16. The method as recited in claim 14, wherein said traffic condition in terms of said average queuing delay of said secondary users is estimated in said decision center by using time window with low pass property.

17. The method as recited in claim 16, wherein said time window of the shorter length is used to decrease time overhead in said spectrum sensing when each said sensing node adopts the same detection and sensing method, and said time window length should be increased in order to guarantee the reliability of said sensing process if different said sensing nodes use different detection and sensing methods, wherein said time window length is updated for the reliable synchronous said sensing process and the shorter said time window length is more efficient for the identification of said sensed spectrum.

18. An Open Wireless Architecture (OWA) spectrum sensing method for secondary user of spectrum in cognitive radio networks, said method comprising selection of sensing node, configuration for location of each said sensing node, sensing frame for control of sensing process, and division of sensing region, wherein configuration of said sensing node is based on node selection and node location in different divided small sensing areas, and implementation of said sensing process is based on both sensing scheduling and spectrum signal sensing, and
   wherein said method further comprising a process as to which frequency band is sensed by which said sensing node that is a cooperative sensing mechanism by using multiple selected said sensing nodes, wherein each said secondary user of spectrum is selected as one of said sensing nodes depending on its current service condition (active or idle) and if one said secondary user is idle, then it may be selected as one said sensing node to fulfill local spectrum utilization sensing with a local sensing result collected by a decision center of said spectrum sensing, otherwise it is not selected to complete sensing task,
   wherein priority for said selection of sensing node is divided into fourth levels, each denoted by two bits, f2 and f3 in said sensing frame for said control of sensing process, and for each said secondary user, active or idle condition is represented by letting f2 be 1 or 0 respectively, and delay-sensitive or non-delay-sensitive service is denoted by making f3 be 1 or 0 respectively, so that each said secondary user can be in one of four conditions, 00 01, 10 and 11 that are first, second, third and fourth priority level respectively, wherein said selection of sensing node is completed based on joint consideration of current user condition (active or idle) and type of service (delay-sensitive or non-delay-sensitive) to select each said sensing node before sensing task is started.

* * * * *